United States Patent
Beaudoin

[15] 3,659,470
[45] May 2, 1972

[54] VARIABLE DIAMETER CENTRIFUGAL PULLEY WITH MEANS TO VARY THE MASS OF CENTRIFUGAL WEIGHTS

[72] Inventor: Leon Beaudoin, 158 Marchand Street, Drummondville, Province of Quebec, Canada

[22] Filed: Sept. 29, 1970

[21] Appl. No.: 76,426

[52] U.S. Cl. .................................................... 74/230.17
[51] Int. Cl. ................................................ F16h 55/52
[58] Field of Search ........................................ 74/230.17 E

[56] References Cited

UNITED STATES PATENTS 3,492,884  2/1970  Beaudoin ..................... 74/230.17 E Primary Examiner—C. J. Husar
Attorney—Pierre Lesperance

[57] ABSTRACT

A variable diameter centrifugal pulley for use as a drive pulley in a variable speed belt and pulley transmission for snowmobiles and other vehicles, of for any machinery requiring a variable speed transmission, wherein the centrifugal weights consist of blocks provided with a cavity, closure means for said cavity, and calibrating elements removably inserted within said cavity, in order to vary the mass of the centrifugal weights, and thus adjust the rotation speed at which clutching takes place and the variation of the belt diameter on the pulley with change in the rotational speed of the pulley. The pulley also has a spring in which the increase of its resisting force is a non-linear function of the amount of its shortening so as to obtain belt declutching during engine deceleration at substantially the same rotational speed as during engine acceleration.

14 Claims, 11 Drawing Figures

PATENTED MAY 2 1972
3,659,470
SHEET 1 OF 2
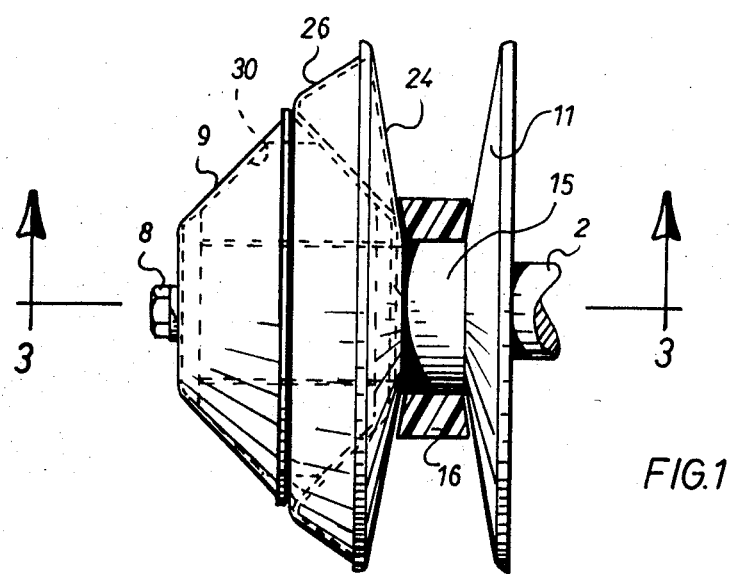
FIG.1
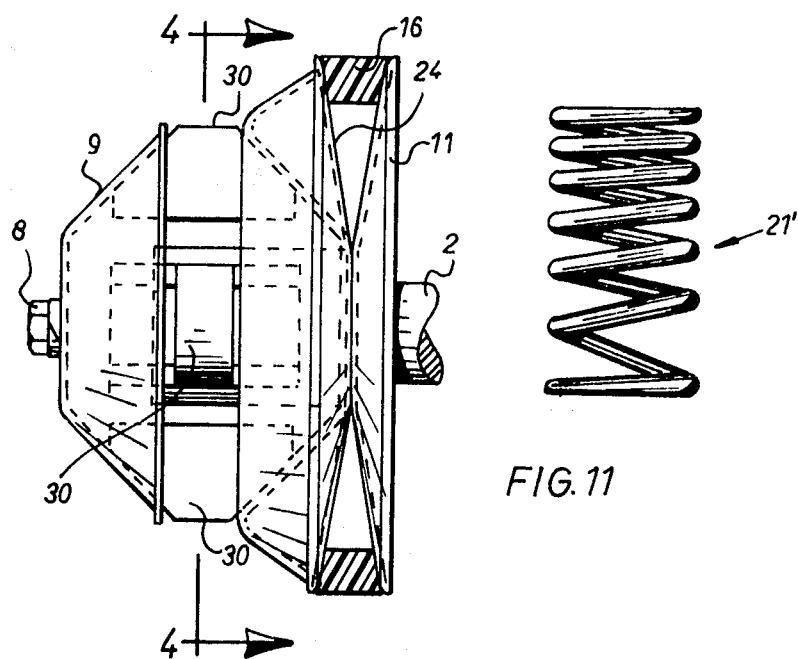
FIG.2
FIG.11
INVENTOR
Léon BEAUDOIN
BY Pierre Lespérance
AGENT

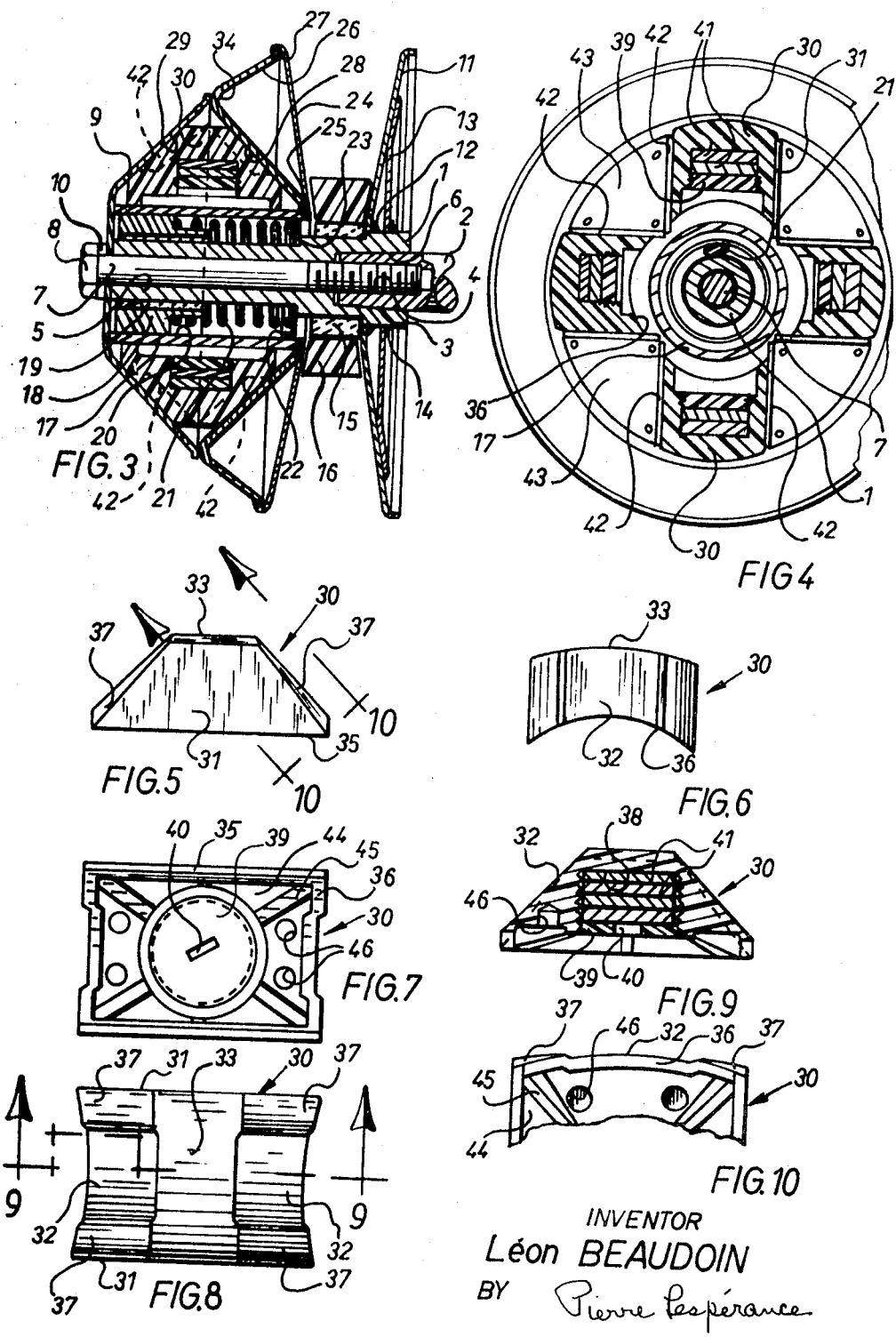

VARIABLE DIAMETER CENTRIFUGAL PULLEY WITH MEANS TO VARY THE MASS OF CENTRIFUGAL WEIGHTS

The present invention relates to a variable diameter pulley for use in a variable speed pulley and belt transmission and used as a drive pulley operated by centrifugal force.

In known types of variable speed and belt transmissions used in snowmobiles, motor scooters, and other similar vehicles, the variable diameter centrifugally operated pulley includes clutching means which automatically declutches the transmission belt below a predetermined speed. With increase of pulley speed the belt first becomes clutched and then its effective diameter on the pulley progressively increases through a maximum with automatic decrease of the effective diameter of the belt on the driven pulley so as to decrease the transmission ratio with increase of engine speed, the transmission ratio being defined as the input shaft rotational speed over the output shaft rotational speed. The graph curve transmission ratio versus engine speed must be varied in accordance with a number of characteristics of the vehicle, including the horse power rating of the engine, the weight of the vehicle, the type of terrain on which the vehicle will normally travel, the type of track of the vehicle, the inherent frictional resistances of the vehicle, and the like. Therefore, in practice, a manufacturer of snowmobiles, and the like, must provide a great number of different models of variable diameter drive pulley resulting in substantial increase in the manufacturing cost of said pulleys. Moreover, different users of snowmobiles, and the like vehicles, may wish their vehicle to have different transmission characteristics depending on the particular use of the vehicle. For instance, when travelling in deep snow, one desires a higher transmission ratio than when travelling on compacted snow or ice, racing will also requires a different transmission ratio versus speed curve than for ordinary cruising.

It is therefore the general object of the present invention to provide a variable diameter centrifugal drive pulley for a variable speed belt and pulley drive which incorporates means to vary at will the transmission ratio versus speed curve. The adjustment can be made by the user as well as by the manufacturer to suit individual requirements and the requirements of the particular model of vehicle being manufactured.

A more specific object of the present invention relates to means in a pulley of the character described for varying the effective mass of the centrifugal weights, by means of calibrating weight elements.

Another object of the present invention relates to a pulley of the character described in which the mass of the centrifugal weights can be varied and calibrated in a very simple and easy manner by any user of the vehicle, in which the pulley is mounted.

Known variable diameter centrifugal combined pulley and clutches have a transmission ratio versus speed curve which is different during acceleration and during deceleration of the engine. Actual measurements have shown that declutching of the transmission belt takes place at a lower rotational speed during deceleration than the speed at which clutching takes place during acceleration. From this it follows that during deceleration the transmission tends to continue to drive the vehicle at a low transmission ratio, therefore the vehicle is slow to respond to engine deceleration which might be dangerous in situation where quick deceleration and braking is important.

It is therefore another object of the invention to provide means which overcome the above noted slow response of the transmission to engine deceleration.

A more specific object of the invention is to eliminate the above noted slow response by modifying the type of spring used in the pulley and which serves to move the axially movable pulley flange against the action of the centrifugal weights.

The foregoing and other objects of the present invention will become more apparent during the following disclosure and by referring to the drawings, in which:

FIG. 1 is an elevation of the pulley in declutched position, and showing the transmission belt in cross section;

FIG. 2 is a view similar to that of FIG. 1 but with the belt in a maximum diameter position;

FIG. 3 is a longitudinal section of the pulley and belt along line 3—3 of FIG. 1;

FIG. 4 is a cross section of the pulley taken along line 4—4 of FIG. 2;

FIG. 5 is a side elevation of one of the centrifugal weights;

FIG. 6 is an end elevation of the centrifugal weight;

FIG. 7 is an end view of the underside of the weight;

FIG. 8 is a top plan view of the weight;

FIG. 9 is a longitudinal section of the weight taken along line 9—9 of FIG. 8;

FIG. 10 is a partial end elevation of the weight taken along line 10—10 of FIG. 5; and FIG. 11 is an elevation of one embodiment of the coil spring to be used in the pulley.

In the drawings, like reference characters indicate like elements throughout.

The pulley of the invention comprises a shaft portion 1 adapted to be firmly secured at one end to a driving shaft 2 of an engine, such as an electric motor or internal combustion engine. Shaft 2 normally has a tapered portion 3 and an inwardly threaded axial bore 4. Shaft portion 1 has an axial through bore 5 terminated at one end by an enlarged tapered socket portion 6 adapted to frictionally engage the tapered portion 3 of driving shaft 2.

A through bolt 7 freely extends within the bore 5 of shaft portion 1 and is screwed within the threaded bore 4 of driving shaft 2 to firmly hold the shaft portion 1 against rotation relative to the driving shaft 2. Head 8 of bolt 7 serves also to firmly secure a frusto-conical cover member 9 to shaft portion 1 and drive said cover member 9 in rotation along with shaft portion 1. A lock washer 10 prevents unscrewing of bolt 7.

A pulley flange 11 is rigidly secured to shaft portion 1, as by welding 12. This pulley flange 11 is preferably reinforced by a web 13 also welded to the shaft portion 1, at 14, and welded at its periphery, to the pulley flange 11.

A bushing 15, preferably made of brass, is freely rotatable on shaft portion 1 adjacent fixed pulley flange 11. Bushing 15 serves as a rest for the transmission V-belt 16 in the declutched position of the latter, so as to prevent wear thereof. A sleeve 17 spacedly surrounds shaft portion 1 and has an inside diameter slightly greater than bushing 15 so as to overlie the latter in certain positions of the sleeve.

Sleeve 17 is rigidly secured to a guiding inner sleeve 18 which is inwardly lined with a frictionless bushing 19 in free sliding and rotational contact with the outside cylindrical smooth surface of shaft portion 1. Guiding sleeve 18 is secured to one end of the outer sleeve 17 and defines therewith an annular chamber 20 for receiving one end of a compression coil spring 21, the other end of which rests against a flanged washer 22 which abuts a shoulder 23 of shaft portion 1. Thus, the spring 21 freely surrounds the shaft portion and urges the sleeve 17 into a limit position abutting cover member 9. The end of the sleeve 17 remote from cover member 9, carries a second pulley flange 24, which is the axially movable pulley flange of the assembly. This pulley flange 24 is welded to the end of the outer sleeve 17 as at 25 and is reinforced by an annular member 26 of L-shaped cross section and welded at 25 to the outer sleeve 17 and to the pulley flange 24 and at its outer periphery to the outer periphery of the pulley flange 24 as at 27.

Annular member 26 together with cover member 9 defines two opposite frusto-conical surfaces 28, 29, equally inclined with respect to the axis of shaft portion 1. The inclination of the two surfaces 28 and 29 is normally different from the inclination of the two pulley flanges 11 and 24, their angle with respect to the shaft portion being smaller.

A plurality of angularly equally spaced centrifugal weights 30, preferably four such weights, are disposed between cover member 9 and annular member 26 and serve to progressively move the movable pulley flange 24 towards the fixed pulley flange 11 against the action of coil spring 21, with increase in the rotational speed of shaft portion 1.

The weights 30 are preferably made of synthetic resin and consist of blocks having a generally trapezoidal shape, when seen in side elevation, and are of rectangular shape when seen in plan view. They have generally flat spaced parallel side faces 31, equally inclined end faces 32, a radially outer transversely convex face 33, the radius of curvature of which is substantially equal to the radius of curvature of the outer periphery of the cover 9, and opposite apex part 34 of annular member 26. The two longitudinally radially inner edges 35 of the block 30 are straight, while the radially inner end transverse edges 36 are concave and have a radius of curvature substantially equal to the radius of curvature of the outer surface of sleeve 17 to conform to the latter in the radially innermost position of block 30. The end faces 32 are transversely convex but with their radius of curvature smaller near the radially inner transverse edge 36 than near the radially outer face 33 of the block. These end faces 32 are provided adjacent the side faces 31 with slightly protruding elongated lands 37 adapted to engage in a slidable manner the frusto-conical surfaces 28 and 29. These lands 37 form a twisted surface longitudinally of the land, as shown in FIGS. 5 and 10, such that in the radially innermost position of the blocks, the lands 37 will contact the surface 28 and 29 over their entire area, despite the smaller radius of curvature of surfaces 28 and 29 in their zone in contact with the radially inner ends of the lands 37, than in their zone in contact with the radially outer ends of lands 37.

At the radially inner face of each block, there is formed a cylindrical inwardly threaded cavity 38, removably closed by a disk shaped outwardly threaded plug or cover member 39 screwed within the cavity 38. Plug 39 is also preferably made of synthetic resin and is provided with an elongated central hole 40 to receive the driving tip of a screw driver, or the like, for screwing or unscrewing the plug 39.

The bottom of cavity 38 is located close to the radially outer face 33 of the block and is adapted to receive one or more metal disks 41 serving as calibrating weights for the centrifugal block 30. The disk shaped weights 41 are freely inserted within the cavity 38 in the required number and then the plug 39 is screwed tight against the calibrating weights 41 to prevent rattling of the same within the block. The plug 39, when screwed tight against the bottom of cavity 38 or against one or more calibrating weights 41, will not unscrew itself due to vibration, or the like. The calibrating weights 41 are thin enough so as to preferably be able to insert up to ten weights 41 within a single cavity 38. Thus, the overall mass of the centrifugal block 30 may be adjusted in a fine manner. All the calibrating weights 41 are of equal mass and similarly all the plugs 39 and all the blocks 30. It is obvious that one will insert an equal number of calibrating weights 41 in the cavity 38 of each block 30.

The centrifugal blocks 30 are guided for radial movement by the inturned guiding edges 42 of plates 43 rivetted or otherwise secured to the frusto-conical surfaces 28 and 29. Plates 43 are triangular in shape, as shown in FIG. 4, and each provides two right angularly disposed guiding edges 42, for two adjacent blocks 30. The guiding edges 42 are arranged in spaced parallel pairs engaging the marginal portions of the side faces 31 of each block 30 for slidably guiding the same in their radial movement.

The blocks 30 are preferably made of synthetic resin, but may be made of metal, fibrous material, or other rigid material having a low coefficient of friction with the metal surfaces of the pulley.

The areas 44 along the side walls 31 and cavity and between the reinforcing webs 45 are preferably hollowed out and similarly there is provided holes 46 to decrease as much as possible the amount of synthetic resin used to make the block.

The blocks are disposed between the frusto-conical surfaces of cover member 9 and annular member 26 between the pairs of guiding edges 42 and with their long axis parallel to the axis of shaft portion 1.

When the pulley is at rest or rotates at low speed, the removable pulley flange 24 is maintained in its most distant position from the fixed pulley flange 11 under the action of compression coil spring 21, the centrifugal blocks 30 being in their radially innermost position. The V-belt 16 is out of contact with the pulley flanges and rests on the bushing 15. With increase in the rotational speed of the pulley, the blocks 30 move radially outwardly under centrifugal force and because they engage the surfaces 28, 29, they cause axial displacement of the movable flange 24 towards the fixed pulley flange 11, and therefore, the belt is caused to ride on progressively radially outer zones of the two pulley flanges until in the maximum diameter position of the belt, the axially movable pulley flange 24 abuts against the fixed pulley flange 11, as shown in FIG. 2. In this position, sleeve 17 overlies bushing 15. In this position also, the spacing between cover member 9 and the apex zone 34 of casing 26 is less than the length of the blocks 30, such that the latter cannot escape from the pulley.

It is noted that the assembly of the movable pulley flange 24, sleeves 17 and 18 and bushing 19 are mounted on shaft portion 1 for free rotational as well as axial movement thereon. The blocks 30 serve not only to produce axial movement of the movable pulley flange 24, but also to transmit rotational movement of said pulley flange 24 from the cover 9, such that the two pulley flanges rotate at the same speed. This is achieved by the blocks 30 engaging the guiding edges 42 of both cover member 9 and annular member 26, so there is no need for providing splines, kegs and the like on shaft portion 1, and inner sleeve 18.

It has been found that such splines wear down very quickly when the pulley is mounted on the output shaft of an internal combustion engine, due the vibrations transmitted to the pulley.

It is easy for a manufacturer to vary the number of calibrating weights 41 in each centrifugal block 30 so as to precisely adjust the overall mass of the weights 30 in accordance with the application to which the pulley is put. For instance, in snowmobiles, wherein the horse power rating of the engine, the weight of the vehicle, and other factors vary considerably from one model of vehicle to another, it is a simple matter to mass produce the pulley in standard size and shape and including its spring 21 while simply varying the number of calibrating weights 41 depending on the vehicle model, in order to obtain the exact clutching speed desired and the required transmission ratio versus r.p.m. curve.

The user of the snowmobile equipped with the pulley of the invention, may likewise easily vary and adjust the overall mass of the centrifugal blocks 30. It is a simple matter to unscrew bolt 7, remove cover member 9, and blocks 30. The cavity plugs 39 may be unscrewed by means of a simple screwdriver and the number of calibrating weights 41 changed in accordance with the requirement.

In accordance with the second feature of the present invention, instead of using a compression coil spring 21 in which the circumvolutions are of equal pitch, a variable pitch compression coil spring 21', shown in FIG. 11, is used. This overcomes the difference of operative characteristics of the pulley when accelerating and decelerating. When a constant pitch compression spring 21 is used, it has been found that declutching of the V-belt takes place at a lower speed when decelerating than clutching takes place when accelerating, and this independently of the mass of the centrifugal blocks although the r.p.m. difference between clutching and declutching becomes less with increase in the block mass. This results in a rather slow response of the transmission when decelerating which might be dangerous when quick stopping of the vehicle is desired.

Moreover, it has been found that the same slow response is present in other types of centrifugal variable diameter pulleys where the centrifugal masses are of a different type than the blocks in accordance with the invention.

It has been found that this problem is caused mainly by the friction of the V-belt on the pulley flanges and the centrifugal force exerted on the portion of the V-belt surrounding the pulley which results in a delay for the V-belt in moving radially inwardly of the pulley flanges during deceleration of the engine. With the variable pitch spring 21', the graph curve expressing the resistance of the spring to compression versus the amount of shortening is non linear in that the resistance to compression increases at a much greater rate in the last stages of the shortening than in the initial stages. Clutching of the belt during acceleration takes place at substantially the same speed of rotation as for an ordinary constant pitch spring of otherwise the same characteristics. Slightly greater speed of the pulley must be achieved before the belt takes a maximum diameter around the pulley but upon deceleration the increased energy stored in the spring compared to a constant pitch spring, causes immediate inwardly radial movement of the belt on the pulley, and declutching of the belt takes place at substantially the same speed as clutching took place during acceleration. Instead of a variable pitch spring, one can use a spring of constant pitch, but made from a wire of progressively decreasing diameter.

While the variable diameter pulley has been described for use in vehicle variable speed transmissions, it is obvious that it can be used in variable speed transmission utilised in any kind of machinery requiring such a transmission.

What I claim is:

1. A centrifugal weight for use in a variable diameter centrifugally operated pulley, comprising a block of elongated shape having substantially parallel flat lateral surfaces, a top surface, a bottom surface, and inclined end surfaces converging towards said top surface, said block having a cavity made therein and opening at one of said top and bottom surfaces and a closure for removably closing said cavity, said cavity adapted to receive calibrating weight elements.

2. A centrifugal weight as claimed in claim 1, wherein said cavity is of cylindrical shape and is inwardly threaded from its open end to its bottom, said closure being an externally threaded disk like plug screwed within said cavity and adapted to tightly hold the calibrating weight elements against the bottom of said cavity.

3. A centrifugal weight as claimed in claim 1, wherein said end faces are each provided with a pair of spaced, raised elongated lands extending between said top and bottom surfaces and conforming to a frusto-conical concave surface of revolution with its axis parallel to the long axis of the block.

4. A centrifugal weight as claimed in claim 1, wherein said top surface is transversely convex and said bottom surface is transversely concave, the radius of curvature of the top surface being greater than the radius of curvature of the bottom surface.

5. A centrifugal weight as claimed in claim 2, wherein said disk like plug is provided with an elongated hole for receiving the blade of a screwdriver for screwing and unscrewing said plug.

6. A variable diameter pulley for a V-transmission belt comprising a shaft portion, a first pulley flange secured to said shaft portion, a circular member secured to said shaft portion and spaced from said first pulley flange, a second pulley flange mounted on said shaft portion for axial movement towards and away from said first pulley flange and located between the latter and said circular member, spring means urging said second pulley flange away from said first pulley flange, said circular member and second pulley flange forming opposed surfaces of revolution, at least one of said surfaces inclined relative to the longitudinal axis of said shaft portion radially outwardly towards the other of said surfaces, centrifugal blocks extending between and having their end faces in slidable contact with said opposed surfaces, radial guide means on both said surfaces guiding said blocks for radial movement under centrifugal force to move said second pulley flange towards said first pulley flange against the action of said spring means, each centrifugal block having a cavity made therein and each having a removable closure for said cavity, said cavity adapted to receive a variable number of calibrating weight elements.

7. A variable diameter pulley as claimed in claim 6, wherein said cavity is of cylindrical shape and is inwardly threaded from its opened end towards its bottom, said closure is an externally threaded disk like plug element adapted to be screwed within said cavity down to its bottom so as to hold said weight elements against movement within said cavity.

8. A variable diameter pulley as claimed in claim 7, wherein said centrifugal blocks have an elongated shape, a radially outer face, a radially inner face and end faces converging towards said radially outer face, said cavity opening at said radially inner face of said block.

9. A variable diameter pulley as claimed in claim 6, wherein both said surfaces are concave and substantially frusto-conical in shape and are substantially equally radially outwardly converging, said blocks being movable outwardly between a radially innermost and a radially outermost position, being of elongated shape with transversely curved inclined end faces conforming to said frusto-conical surfaces in the innermost position of said blocks.

10. A variable diameter pulley as claimed in claim 6, wherein said second pulley flange is rotatably as well as axially movable on said shaft portion, said blocks constituting means to drive said second pulley flange at the same rotational speed as said first pulley flange due to the interengagement of said blocks with the guide means of both said surfaces.

11. A variable diameter pulley as claimed in claim 10, wherein said cavity is of cylindrical shape and is inwardly threaded from its opened end towards its bottom, said closure is an externally threaded disk like plug element adapted to be screwed within said cavity down to its bottom so as to hold said weight elements against movement within said cavity.

12. A variable diameter pulley as claimed in claim 6, wherein said second pulley flange comprises two sections secured together, one section constituting a pulley flange proper and the other section of annular shape when seen in plan view and of right angular section with its radially inner edge secured to said pulley flange proper at the radially inner edge of the latter and its radially outer edge secured to the periphery of said pulley flange proper, said other section reinforcing said pulley flange proper and providing said surface for slidably receiving one end of said centrifugal blocks.

13. A variable diameter pulley as claimed in claim 12, wherein said spring means is a compression coil spring and its resistance to shortening is a non linear function of the amount of shortening.

14. In a centrifugally operated variable diameter pulley having a fixed pulley flange, an axially movable pulley flange movable between first and second limit positions adjacent to and spaced from said first pulley flange respectively, spring means urging said movable pulley flange away from said fixed pulley flange, and centrifugally operated means acting on said movable pulley flange to urge the latter towards said fixed pulley flange against the action of said spring means, said spring means opposing the action of said centrifugally operated means with a force which increases at a greater rate when said movable pulley flange approaches said first limit position than when said movable pulley flange leaves said second limit position.

* * * * *